United States Patent Office 2,717,262
Patented Sept. 6, 1955

2,717,262

PROCESS OF PRODUCING CHRYSANTHEMIC ACID ESTERS OF CYCLOPENTENYL KETONIC ALCOHOLS AND PRODUCTS

Robert M. Cole, Bryn Athyn, Pa., assignor to Chemical Elaborations, Inc., Philadelphia, Pa., a corporation of Delaware No Drawing. Application August 15, 1949, Serial No. 110,459

13 Claims. (Cl. 260—468)

This invention relates to the synthesis of ketonic esters, and is particularly concerned with the synthesis of esters of chrysanthemic acids with cyclic ketonic alcohols. These compounds include the naturally occurring pyrethrolone and cinerolone esters of the chrysanthemic acids.

According to the invention, certain cyclic and straight chain ketones are chlorinated to produce extremely reactive ketonic chlorides; for example, cyclo pentanone, cyclo pentenone, methyl cyclo petanone, methyl cyclo pentenone, and acetonyl acetone are converted to the corresponding ketonic chlorides. These chlorides are then reacted with mono carboxylic chrysanthemic acid or its alkali metal or ammonium salts to produce intermediate esters which are themselves powerful insecticidal agents exhibiting pyrethrin activity.

The intermediate esters are then condensed with unsaturated chlorides or aldehydes to form side chains on the ketonic ring, these compounds including the pyrethrins and cinerines.

In the case of acetonyl acetone, the ketonic ring is formed after esterification, as indicated just below.

According to the invention, acetonyl acetone (I) is chlorinated to produce chlor acetonyl acetone (II)

```
      O   H H  O              O  Cl  H H  O
      ‖   | |  ‖               ‖  |   | |  ‖
  HC—C—C—C—C—CH          HC—C—C—C—C—CH
      H   H H  H               H      H H  H
         (I)                         (II)
```

Chlor acetonyl acetone (II) is reacted with a chrysanthemic acid residue, for example, mono carboxylic chrysanthemic acid (III) or its sodium salt (IV) to produce acetonyl-acetonyl chrysanthemate (V).

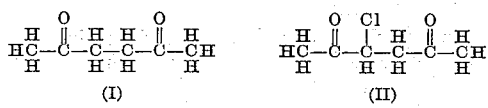

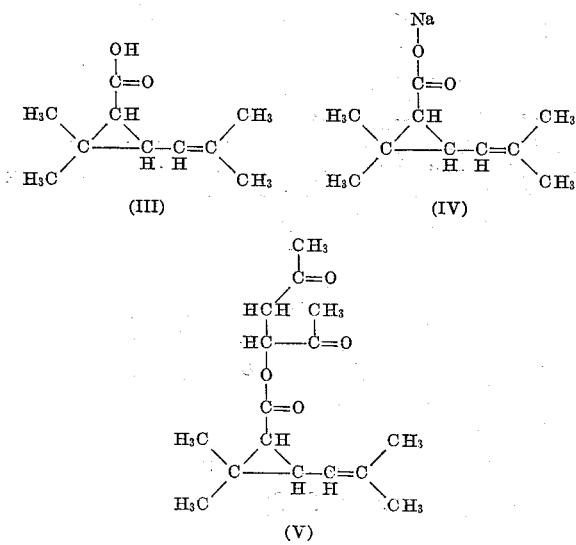

The acetonyl acetone portion of the molecule is condensed to form a methyl cyclo pentenonyl ring yielding 4-methyl cyclo pentenonyl chrysanthemate. The ring probably closes in a manner to produce a compound having structure VI, although the closure may take place in a manner to place the ester linkage at the 3-position.

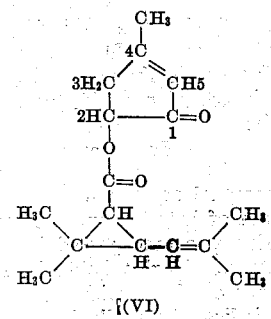

This last compound, called for convenience herein an intermediate chrysanthemic ester, is then reacted with certain unsaturated bodies to form a side chain on the molecule adjacent the carbonyl group, that is, at the 5-position in the methyl cyclo pentenonyl ring, the probable structure of such compounds being generically illustrated at (VII)

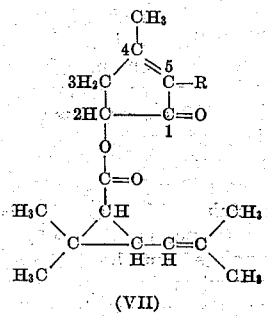

The successful chlorination of the ketones above enumerated is peculiarly difficult to achieve. However, according to the method described more fully hereinbelow, I have succeeded in chlorinating them directly and am enabled to obtain excellent yields of products of great purity in a relatively simple manner.

Certain of these chlorides, and particularly acetonyl acetone chloride, are relatively unstable compounds, due to the extreme activity of the chlorine atom adjacent the carbonyl group. In fact, this chloride is so unstable as to undergo rapid spontaneous degradation if allowed to stand under ordinary conditions.

However, according to the method of the present invention, I exploit the extreme activity of the chlorine compound by esterifying the chlor body immediately after its formation, in accordance with either of two methods set forth hereinbelow.

I have found that esters of chrysanthemic acid formed in accordance with this method are exceedingly stable compounds which may be steam distilled under proper conditions without deleterious effect.

According to the invention, the ketone is chlorinated by passing gaseous chlorine therethrough while maintaining the mass at controlled low temperatures. More specifically, the invention contemplates the introduction of gaseous chlorine into the ketone at an initial temperature within from five to ten degrees above the melting point of the ketone in question. Even at these temperatures, the ketone begins to darken after a small quantity of chlorine has been absorbed. I have found, however, that if the temperature is then substantially reduced, further coloration is prevented. Furthermore, if the temperature is lowered immediately upon the first signs of darkening, and chlorination continued, the initial color disappears and a colorless product is obtained. The temperature during the second phase of the chlorination, therefore, should be substantially below the melting point of the ketone in question, and may be as low as from −50° C. to −60° C. The chlorination is continued at this temperature until the theoretical amount of chlorine has been introduced. When the chlorination has been completed, the product is washed in water containing a few pieces of Dry Ice and a quantity of bicarbonate of soda. During the washing step, some of the hydrogen chloride is carried out by the bubbles of $CO_2$ from the Dry Ice, while the remainder is neutralized by the bicarbonate. The chlorination may be carried out in accordance with the method of the following example:

Example I 1 mole of acetonyl acetone was placed in a flask and cooled in a bath of Dry Ice and methanol to −20° C. Gaseous chlorine was then passed into the ketone, the rate of delivery of chlorine being kept below the rate at which chlorine combines with the ketone. An excess of chlorine is indicated visually by the assumption of a yellow color by the reacting mass, due to the presence of unreacted chlorine in solution in the ketone.

As soon as a small portion of the chlorine was absorbed, the temperature of the ketone was lowered to −30° C., a temperature below the normal freezing point of unchlorinated acetonyl acetone. At this temperature, the rate of delivery of gas to the mixture was increased, since the presence of the chlorinated acetonyl acetone appears to facilitate the reaction.

When the theoretical amount of gas had been introduced, the chlorination was terminated, and the reaction mass poured into 100 cc. of water to which had been added a few pieces of Dry Ice. Three-fourths of a mole of bicarbonate of soda was then added. The oily phase was separated, more Dry Ice was added, and the product was dried with calcium chloride. The yield of chlorinated acetonyl acetone (structure II) was 95% of theory.

As has been pointed out above, the extreme activity of the chlor body requires that the esterification step follow the chlorination step almost immediately. Desirably, the temperature of the chlor ketone is not permitted to rise between the completion of the washing step and the commencement of the esterification step.

According to the invention, either of two methods of esterification may be employed, namely, a metathetic reaction between the chlor ketone and the sodium salt of a chrysanthemic acid, or, alternatively, a novel pyridine condensation may be employed. The metathesis reaction may be conducted in accordance with the following example:

Example II–A 1 mole of anhydrous sodium chrysanthemate was dissolved in 800 cc. of dry methanol, and 1 mole of dry chlor acetonyl acetone added. The mixture was permitted to stand for a few hours. The reaction was energetic and exothermic so that heating was unnecessary. After standing several hours, the methanol was distilled off, and the residue heated to about 200° C. to effect ring closure. The product was then steam distilled. The ester obtained boiled between 112 and 114° C. at 5 millimeters' pressure, and has a probably structure indicated at VI above. The yield was 65%.

Example II–B

In this run, the method of Example II–A was followed, except that ring closure was effected by the addition of a catalytic amount of boiling 5% HCl. In this experiment, the yield was 73%.

As was indicated above, I have also effected esterification by a novel condensation in the presence of pyridine. An example of esterification according to this method is given herebelow:

Example III 1 mole of chlor acetonyl acetone, produced in accordance with the method of Example I, while still at the reduced temperature of the final stage of washing, was slowly poured into 2 moles of pyridine cooled with a few pieces of Dry Ice. The reaction mass was observed to fume profusely. After all the chlor acetonyl acetone had been added, the mass was allowed to remain a few hours in the cold, and 1 mole of chrysanthemic acid added. The reacting mass turned brown and took the form of a liquid heavier than water.

After several hours of standing, the mass was poured in water and steam distilled. The resulting product (probable structure VI) was a light yellow oil, which floats on water. The yield was 170 grams. The product boiled between 112 and 114° C. at 5 millimeters' pressure.

The fact that the oil floats on water indicates that there has been a decrease in density due to the loss of a molecule of water during steam distillation, resulting in ring closure. The identity of this product with the products of Examples II–A and II–B is established by the identity in boiling point.

Side chain compounds, including the naturally occurring pyrethrines and cinerines and their homologues, may be formed by reacting the intermediate ester produced in accordance with the methods of Examples II and III with certain unsaturated compounds in the presence of alkali. While caustic or bicarbonate of soda may be used, in order to eliminate hydrolysis, I prefer to use an alcoholate such as sodium methylate or sodium ethylate. According to the invention, two methods of condensation are employed. In the first, the side chain compound is an aldehyde, while in the second halides are used. Examples of side chain reactions are given just below:

Example IV 5.6 grams (1/10 mole) of dry sodium methylate was weighed under enough ether to thoroughly cover in a mortar, and the methylate was ground to a fine emulsion. The emulsion was then transferred to an Erlenmeyer flask, and 1/10 mole (26 grams) in 20% ether solution of the intermediate chrysanthemic ester produced in accordance with Example II–A was added drop by drop to the emulsion while the flask was cooled in ice.

7 grams of anhydrous crotonaldehyde, dissolved in an equal volume of ether, was then run into the cooled mixture with shaking. After standing about 12 hours, the ether solution was poured into water and acidified with sufficient sulphuric acid to take up the alkalinity. The ether layer was then washed thoroughly with water and dried with calcium chloride, after which the ether was removed, yielding 32 grams of a yellow viscous oil having probable structure VIII. In this diagram, I have indicated a rearrangement of the double bonds in the side chain to the conjugate position, since I believe that the instability of the initial arrangement that is, with a double bond adjacent the ring, undergoes a rearrangement to the structure illustrated in the diagram.

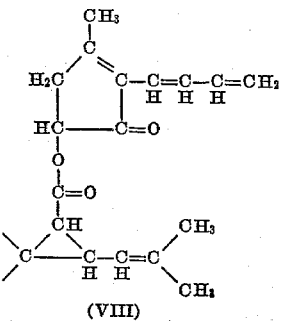

(VIII)

Example V

In this example, 26 grams of the intermediate chrysanthemic ester, 10 grams of methyl ethyl acrolein, and 5.6 grams of sodium methylate were reacted in accordance with the method of Example IV. The experiment yielded over 90% of the theoretical amount of a viscous yellow oil having probable structure IX. This structure also indicates the rearrangement of the double bonds in the side chain to the conjugate position.

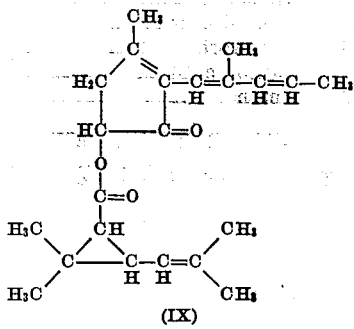

(IX)

*Example VI*

In this run, 8 grams of allyl chloride were combined with 26 grams of intermediate chrysanthemic ester and 5.6 grams of sodium methylate in accordance with the technique of Example IV. After the three ether solutions had been combined, the mixture was refluxed for about 8 hours with visible formation of sodium chloride. The reaction was continued until all of the sodium chloride was precipitated, after which the product (probable structure X) was washed and recovered as in Examples IV and V.

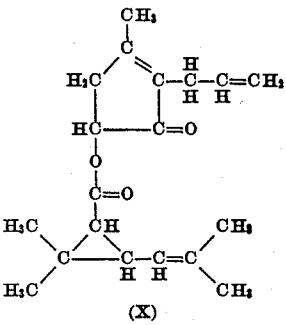

(X)

The intermediate ester produced in accordance with Examples II-A, II-B and III, in addition to its utility as an intermediate in the production of pyrethrins and cinerines and their homologues, is itself an extremely potent insecticide. On standard Peet-Grady tests, this compound has proved to have knock-down activity of the order of the natural pyrethrins. Specifically, in tests made against house flies at concentrations of the order of 10%, the intermediate ester has a knock-down count which is of the order of the knock-down count of the Official Test Insecticide.

In addition, side chain compounds of the type produced by the techniques of Examples IV, V and VI exhibit pyrethrin activity. For example, a compound having structure X, produced in accordance with the method of Example VI, when tested against house flies under standard conditions in 1% concentration exhibited a knock-down count equal to the knock-down count obtained with O. T. I.

In addition to the pyrethrins and cinerines produced in accordance with Examples IV, V and VI, I have also produced active compounds in which the side chain was formed by the reaction between the intermediate ester and other unsaturated chlorides and aldehydes, for example, butadiene chloride, methyl butadiene chloride, methyl pentadiene chloride, furfuryl chloride, and methyl allyl chloride; and acrylic aldehyde, methyl acrylic aldehyde, methyl crotonic aldehyde, dimethyl crotonic aldehyde, and furfuraldehyde.

The methods of producing pyrethrins and cinerines disclosed herein are characterized by their commercial feasibility, each of the method steps being a relatively simple operation requiring relatively inexpensive reagents. The compounds produced, including the intermediate ester and the side chain esters, are of great value as insecticides, exhibiting the combination of non-toxicity to mammals with high toxicity to insects, a combination heretofore achieved only in the naturally occurring pyrethrins and cinerines.

While the structures illustrated herein are supported by all the available analytical data, it should be understood that the determination of the precise structure of these compounds is extremely difficult. Indeed, there is considerable disagreement among those working in the field as to the precise structure of the naturally occurring pyrethrins and cinerines. Whatever the structure of the compounds disclosed herein, they exhibit the characteristic pyrethrin activity, and, accordingly, I wish it to be understood that the invention is not to be limited to the structures disclosed herein.

I claim:

1. The method of producing an insecticide which comprises reacting, under anhydrous conditions, 3 chloro 2,5 hexanedione with a compound selected from the class consisting of mono-carboxylic chrysanthemic acid and its salts.

2. The method of producing an insecticide which comprises dissolving anhydrous sodium mono-carboxylic chrysanthemate in dry methanol, adding an equi-molecular portion of dry 3 chloro 2,5 hexanedione, thereafter distilling off the methanol, heating the residue to about 200° C., and steam distilling the product so obtained.

3. The method of producing an insecticide which comprises dissolving anhydrous sodium mono-carboxylic chrysanthemate in dry methanol, adding an equi-molecular portion of dry 3 chloro 2,5 hexanedione, thereafter distilling off the methanol, adding a catalytic amount of boiling 5% hydrochloric acid and steam distilling the product.

4. The method of producing an insecticide which comprises the steps of slowly pouring 3 chloro 2,5 hexanedione into two equivalent weights of pyridine containing Dry Ice, adding an equivalent weight of mono-carboxylic chrysanthemic acid, washing in water, and steam distilling.

5. The method of producing an insecticide which comprises emulsifying dry sodium methylate in ether, adding methyl cyclo pentenonyl chrysanthemate thereto drop by drop while cooling, adding an ether solution of anhydrous crotonaldehyde to the cooled mixture with shaking, and thereafter acidifying, washing with water, drying with calcium chloride and removing the ether.

6. The method of producing an insecticide which comprises emulsifying dry sodium methylate in ether, adding methyl cyclo pentenonyl chrysanthemate thereto drop by drop while cooling, adding an ether solution of anhydrous methyl ethyl acrolein to the cooled mixture with shaking, and thereafter acidifying, washing with water, drying with calcium chloride, and removing the ether.

7. The method of producing an insecticide which comprises emulsifying dry sodium methylate in ether, adding methyl cyclo pentenonyl chrysanthemate thereto drop by drop while cooling, adding an ether solution of anhydrous allyl chloride, refluxing until the precipitation of sodium chloride ceases, washing the product in water, drying, and removing the ether.

8. The method of producing an insecticide which comprises the steps of chlorinating acetonyl acetone and reacting, under anhydrous conditions, the chlor acetonyl acetone so obtained with a compound selected from the class consisting of mono carboxylic chrysanthemic acid and its salts to produce an ester.

9. A method in accordance with claim 8 and including the further step of reacting under anhydrous conditions, the ester produced by the method of claim 8 with a compound selected from the class consisting of alkene and alkadiene halides and aldehydes in the presence of an alkaline catalyst.

10. A method in accordance with claim 8 and including the further step of reacting, under anhydrous conditions, the ester produced by the method of claim 8 with crotonaldehyde in the presence of sodium methylate.

11. A method in accordance with claim 8 and including the further step of reacting, under anhydrous conditions, the ester produced by the method of claim 8 with methyl ethyl acrolein in the presence of sodium methylate.

12. A method in accordance with claim 8 and including the further step of reacting, under anhydrous conditions, the ester produced by the method of claim 8 with allyl chloride in the presence of sodium methylate.

13. The product of claim 2.

References Cited in the file of this patent

UNITED STATES PATENTS

| | | |
|---|---|---|
| 2,359,459 | Anderson | Oct. 3, 1944 |
| 2,382,313 | Henke | Aug. 14, 1945 |
| 2,387,587 | Hunsdiecker | Oct. 23, 1945 |
| 2,441,183 | Bludworth et al. | May 11, 1948 |
| 2,466,926 | Bruson et al. | Apr. 12, 1949 |
| 2,499,172 | Smith | Feb. 28, 1950 |

OTHER REFERENCES

Nature, vol. 162 (August 7, 1948), pp. 222–223.